United States Patent
Chen

(10) Patent No.: US 11,314,080 B2
(45) Date of Patent: Apr. 26, 2022

(54) DISPLAY DEVICE AND COMPUTER-IMPLEMENTED METHOD OF ADJUSTING CHROMATIC ABERRATION OF DISPLAY DEVICE

(71) Applicant: HUIZHOU CHINA STAR OPTOELECTRONICS TECHNOLOGY CO., LTD., Guangdong (CN)

(72) Inventor: Chingyuan Chen, Guangdong (CN)

(73) Assignee: HUIZHOU CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 354 days.

(21) Appl. No.: 16/492,461

(22) PCT Filed: Aug. 14, 2019

(86) PCT No.: PCT/CN2019/100563
§ 371 (c)(1),
(2) Date: Sep. 9, 2019

(87) PCT Pub. No.: WO2020/248355
PCT Pub. Date: Dec. 17, 2020

(65) Prior Publication Data
US 2021/0405352 A1    Dec. 30, 2021

(30) Foreign Application Priority Data

Jun. 10, 2019  (CN) .......................... 201910497704.7

(51) Int. Cl.
*G09G 3/20* (2006.01)
*G02B 27/00* (2006.01)

(52) U.S. Cl.
CPC ......... *G02B 27/005* (2013.01); *G09G 3/2003* (2013.01); *G09G 2300/026* (2013.01)

(58) Field of Classification Search
CPC .............. G02B 27/005; G09G 3/2003; G09G 2300/026; G09G 5/02; G06F 3/1446
See application file for complete search history.

(56) References Cited

U.S. PATENT DOCUMENTS 8,801,196 B2 *  8/2014  Sawada ................. G06F 3/1446
                                                         353/94
10,657,868 B2 *  5/2020  Biwa ........................ G09G 3/32
(Continued)

*Primary Examiner* — Antonio A Caschera
(74) *Attorney, Agent, or Firm* — Benesch, Friedlander, Coplan & Aronoff LLP

(57) ABSTRACT

A method of adjusting a chromatic aberration of a display device includes defining a tolerance scope of chromatic aberration; determining a varying scope of chromatic aberration of the display device according to chromatic aberrations of the plurality of display screens; defining a plurality of adjusting levels of chromatic aberration according to the tolerance scope of chromatic aberration and the varying scope of chromatic aberration; setting a color offset value corresponding to each of the plurality of adjusting levels of chromatic aberration; and for each of the plurality of display screens, selecting a corresponding adjusting level of chromatic aberration in comparison to one of the plurality of display screens, and inputting a corresponding color offset value of the selected adjusting level of chromatic aberration to each of the plurality of display screens.

9 Claims, 6 Drawing Sheets

(56) References Cited

U.S. PATENT DOCUMENTS 10,726,776 B2 * 7/2020 Zong ................ G09G 3/006
2002/0003544 A1 * 1/2002 Ohtsuka ............ G06F 3/1446
345/589

* cited by examiner

| adjusting levels of chromatic aberration | Adjusting range of chromatic aberration |
|---|---|
| C1 | (+0.004, +0.008) |
| C2 | (+0.002, +0.004) |
| C3 | (0,0) |
| C4 | (-0.002, -0.004) |
| C5 | (-0.004, -0.008) |

FIG. 5

DISPLAY DEVICE AND COMPUTER-IMPLEMENTED METHOD OF ADJUSTING CHROMATIC ABERRATION OF DISPLAY DEVICE

CROSS REFERENCE TO RELATED APPLICATION

This application claims the priority of International Application No. PCT/CN2019/100563, filed on 2019 Aug. 14, which claims priority to Chinese Application No. 201910497704.7 filed on 2019 Jun. 10. The entire disclosures of each of the above applications are incorporated herein by reference.

BACKGROUND OF DISCLOSURE

1. Field of Disclosure

The present disclosure relates to the field of display technology, and more particularly, to a display device and a method of adjusting a chromatic aberration of a display device.

2. Description of Related Art

FIG. 1 is a schematic diagram of a conventional display device. As shown in FIG. 1, a display device 1 includes a plurality of display screens 10 spliced together. For the display device 1, there exist chromatic aberrations among the display screens 10, causing display pictures to be inconsistent. In order to coordinate the display pictures, default values of red, blue, and green of each display screen 10 must be adjusted manually. That is, a chromatic aberration of each display screen 10 is reduced by adjusting white balances. The above way not only wastes much time, but also needs to be accomplished by professionals. Also, if one of the display screens 10 needs to be replaced due to aging, chromaticity of other display screens 10 must be adjusted totally, thereby significantly increasing maintenance costs.

Therefore, it is necessary to provide a display device and a method of adjusting a chromatic aberration of a display device to solve the above problems.

SUMMARY

A technical problem is that, for a conventional display device, there exist chromatic aberrations among display screens, causing display pictures to be inconsistent.

The object of the present disclosure is to provide a display device and a method of adjusting a chromatic aberration of a display device, which can effectively adjust chromaticity of the display device and thus improve problems of chromatic aberration.

In order to realize the above object, the present disclosure provides a method of adjusting a chromatic aberration of a display device including a plurality of display screens spliced together, the method including: defining a tolerance scope of chromatic aberration; determining a varying scope of chromatic aberration of the display device according to chromatic aberrations of the plurality of display screens; defining a plurality of adjusting levels of chromatic aberration according to the tolerance scope of chromatic aberration and the varying scope of chromatic aberration; setting a color offset value corresponding to each of the plurality of adjusting levels of chromatic aberration; and for each of the plurality of display screens, selecting a corresponding adjusting level of chromatic aberration in comparison to one of the plurality of display screens, and inputting a corresponding color offset value of the selected adjusting level of chromatic aberration to each of the plurality of display screens.

In some embodiments, an adjusting range of chromatic aberration of the highest level of adjusting levels of chromatic aberration is the sum of the upper limits of the varying scope of chromatic aberration and the tolerance scope of chromatic aberration.

In some embodiments, an adjusting range of chromatic aberration of the second highest level of adjusting levels of chromatic aberration is the upper limit of the varying scope of chromatic aberration.

In some embodiments, an adjusting range of chromatic aberration of the middle level of adjusting levels of chromatic aberration is zero.

In some embodiments, an adjusting range of chromatic aberration of the second lowest level of adjusting levels of chromatic aberration is the lower limit of the varying scope of chromatic aberration.

In some embodiments, an adjusting range of chromatic aberration of the lowest level of adjusting levels of chromatic aberration is the lower limit of the varying scope of chromatic aberration less the lower limit of the tolerance scope of chromatic aberration.

In some embodiments, the color offset value corresponds to a set of default values of red, blue, and green.

In order to realize the above object, the present disclosure further provides a display device, including: a plurality of display screens spliced together; a processing unit configured to: define a tolerance scope of chromatic aberration; determine a varying scope of chromatic aberration of the display device according to chromatic aberrations of the plurality of display screens; define a plurality of adjusting levels of chromatic aberration according to the tolerance scope of chromatic aberration and the varying scope of chromatic aberration; set a color offset value corresponding to each of the plurality of adjusting levels of chromatic aberration; and for each of the plurality of display screens, select a corresponding adjusting level of chromatic aberration in comparison to one of the plurality of display screens, and input a corresponding color offset value of the selected adjusting level of chromatic aberration to each of the plurality of display screens; and a storage configured to store the color offset value.

In some embodiments, the processing unit selects the corresponding adjusting level of chromatic aberration through an external trigger instruction from one of a remote controller, a computer, a dialer, and a button.

In some embodiments, the storage is selected from one of a read-only memory, a random-access memory, a flash memory, a hard disk, and an optical disk.

The beneficial effect of the present disclosure is that, the chromaticity of the display device can be effectively adjusted, and the problems of chromatic aberration are thus improved.

BRIEF DESCRIPTION OF DRAWINGS

To ensure the features and the technical content of the disclosure are more apparent and easier to understand, please refer to the explanation and the accompanying drawings of the disclosure as follows. However, the accompanying drawings are merely for reference without limiting the disclosure.

FIG. 5 is a table of adjusting levels of chromatic aberration of a display device according to an embodiment of the present disclosure.

DETAILED DESCRIPTION OF EMBODIMENTS

To ensure the objects, the technical solutions, and the effects of the disclosure are clearer and more specific, the disclosure will be explained in conjunction with the accompanying drawings in detail further below. It should be understood that the embodiments described herein are merely a part of the embodiments of the present disclosure instead of all of the embodiments and are not used to limit the disclosure.

Figure 1:
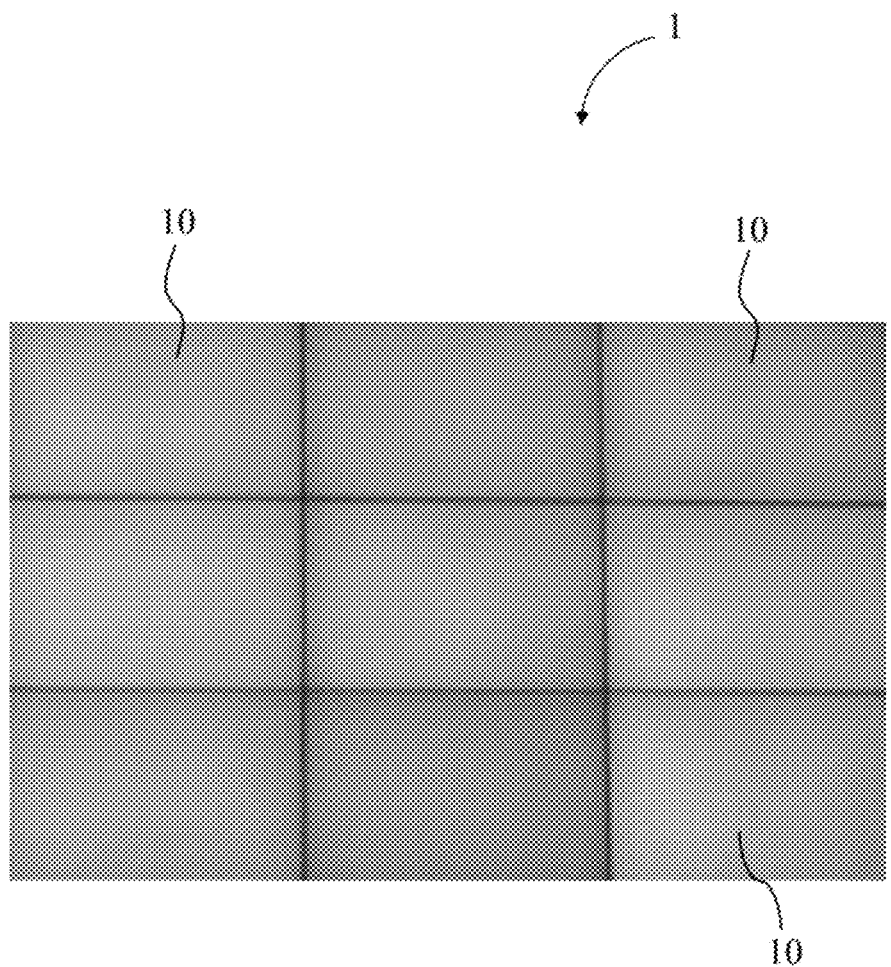
FIG. 1 is a schematic diagram of a conventional display device.
Figure 2:
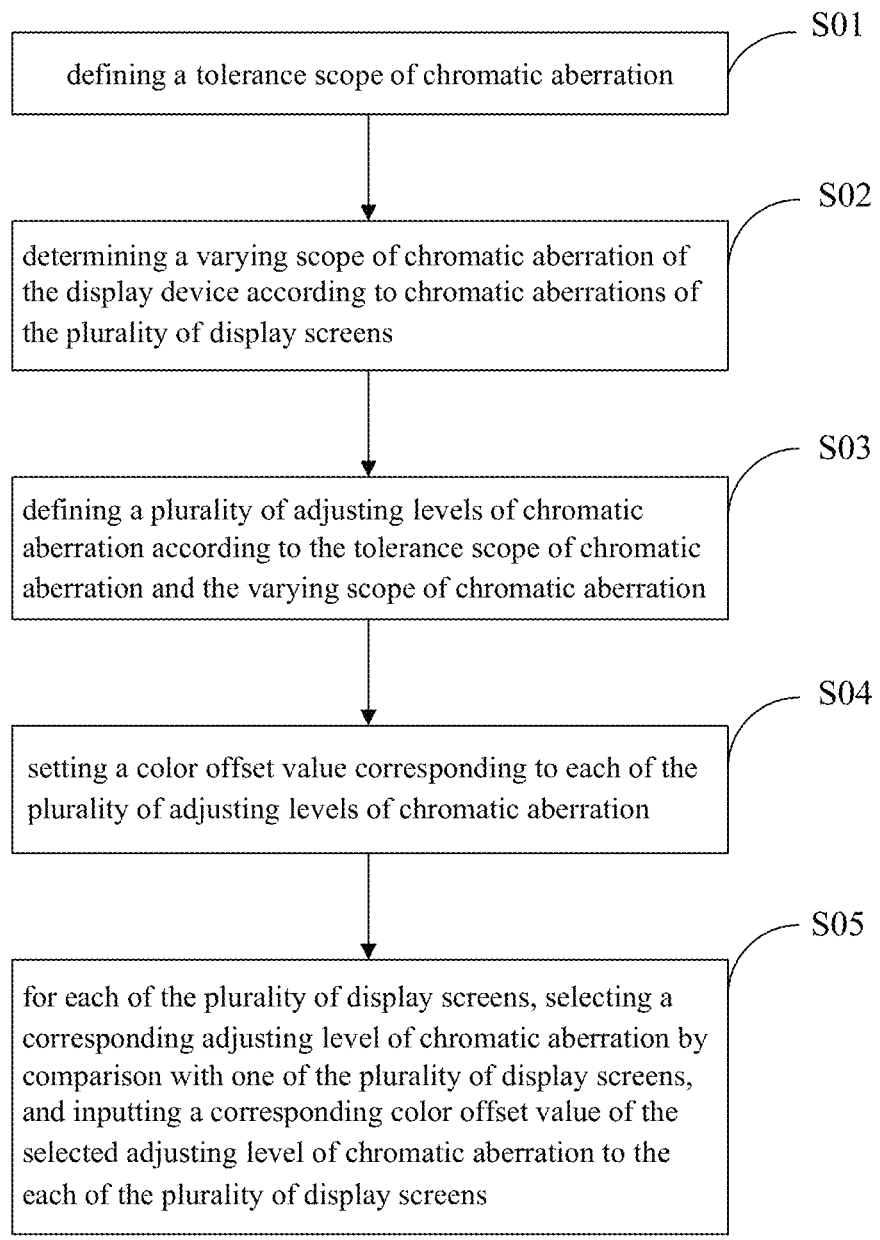
FIG. 2 is a flowchart illustrating a method of adjusting a chromatic aberration of a display device according to an embodiment of the present disclosure.
Figure 3:
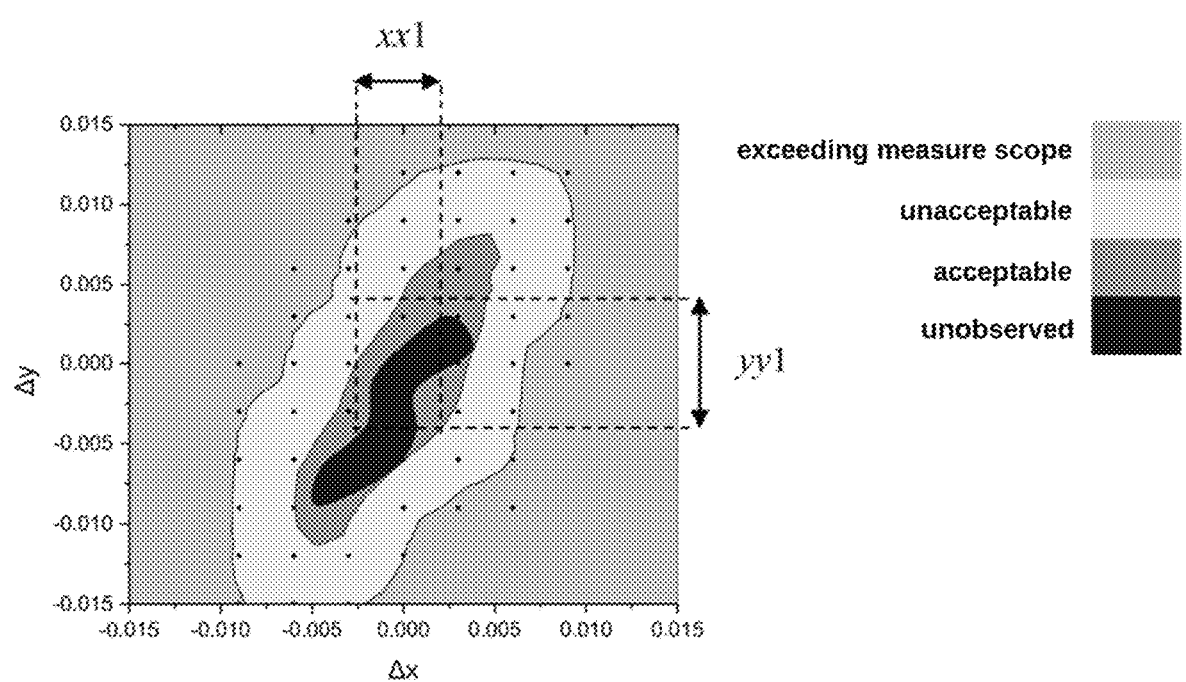
FIG. 3 is a contour map of chromatic aberration according to an embodiment of the present disclosure.

FIG. 2 is a flowchart illustrating a method of adjusting a chromatic aberration of a display device according to an embodiment of the present disclosure. In the present embodiment, the display device includes a plurality of display screens spliced together. The method of adjusting the chromatic aberration of the display device includes the following steps:

Step S01: defining a tolerance scope of chromatic aberration. Please refer to FIG. 3, which is a contour map of chromatic aberration according to an embodiment of the present disclosure. In the present embodiment, the tolerance scope of chromatic aberration (xx1, yy1) is defined as (−0.002, −0.004) to (+0.002, +0.004). The tolerance scope of chromatic aberration (xx1, yy1) is not easy to be observed by human eyes.

Figure 4:
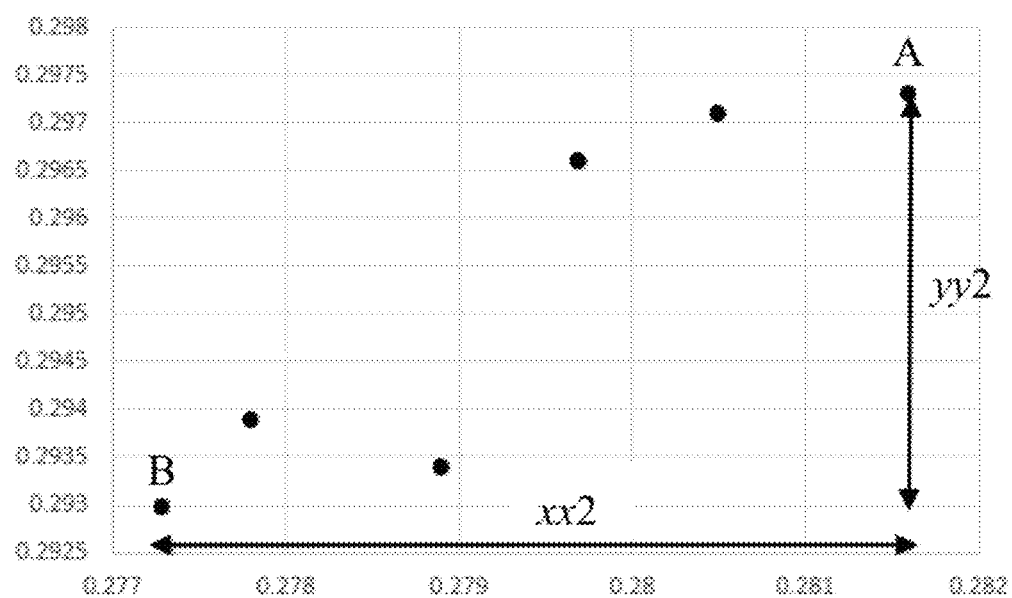
FIG. 4 is a coordinate diagram of chromaticity of a display device according to an embodiment of the present disclosure.

Step S02: determining a varying scope of chromatic aberration of the display device according to chromatic aberrations of the plurality of display screens. Please refer to FIG. 4, which is a coordinate diagram of chromaticity of a display device according to an embodiment of the present disclosure. In the present embodiment, the varying scope of chromatic aberration of the display device (xx2, yy2) is determined as (−0.002, −0.004) to (+0.002, +0.004). Especially for chromaticity A, the varying scope of chromatic aberration of the display device (xx2, yy2) is (−0.002, −0.004). Instead, for chromaticity B, the varying scope of chromatic aberration of the display device (xx2, yy2) is (+0.002, +0.004).

Step S03: defining a plurality of adjusting levels of chromatic aberration according to the tolerance scope of chromatic aberration and the varying scope of chromatic aberration. Please refer to FIG. 5, which is a table of adjusting levels of chromatic aberration of a display device according to an embodiment of the present disclosure. In the present embodiment, an adjusting range of chromatic aberration of the highest level C1 of adjusting levels of chromatic aberration is (+0.004, +0.008), i.e., the sum of the upper limits of the varying scope of chromatic aberration and the tolerance scope of chromatic aberration (+0.002, +0.004) and (+0.002, +0.004). An adjusting range of chromatic aberration of the second highest level C2 of adjusting levels of chromatic aberration is (+0.002, +0.004), i.e., the upper limit of the varying scope of chromatic aberration (+0.002, +0.004). An adjusting range of chromatic aberration of the middle level C3 of adjusting levels of chromatic aberration is zero. An adjusting range of chromatic aberration of the second lowest level C4 of adjusting levels of chromatic aberration is (−0.002, −0.004), i.e., the lower limit of the varying scope of chromatic aberration is (−0.002, −0.004). An adjusting range of chromatic aberration of the lowest level C5 of adjusting levels of chromatic aberration is (−0.004, −0.008), i.e., the lower limit of the varying scope of chromatic aberration (−0.002, −0.004) less the lower limit of the tolerance scope of chromatic aberration (−0.002, −0.004).

Step S04: setting a color offset value corresponding to each of the plurality of adjusting levels of chromatic aberration. Specifically, the color offset value corresponds to a set of default values of red, blue, and green. In general, the color offset value of the highest level C1 of adjusting levels of chromatic aberration has higher brightness and saturation relative to the lowest level C5 of adjusting levels of chromatic aberration.

Step S05: for each of the plurality of display screens, selecting a corresponding adjusting level of chromatic aberration in comparison to one of the plurality of display screens, and inputting a corresponding color offset value of the selected adjusting level of chromatic aberration to each of the plurality of display screens. For example, for the display screens with colors from the weakest to stronger colors, the adjusting levels of chromatic aberration from a high level to a low level are selected in comparison to the display screen with the strongest color, so that there exists no chromatic aberration among the display screens.

Figure 6:
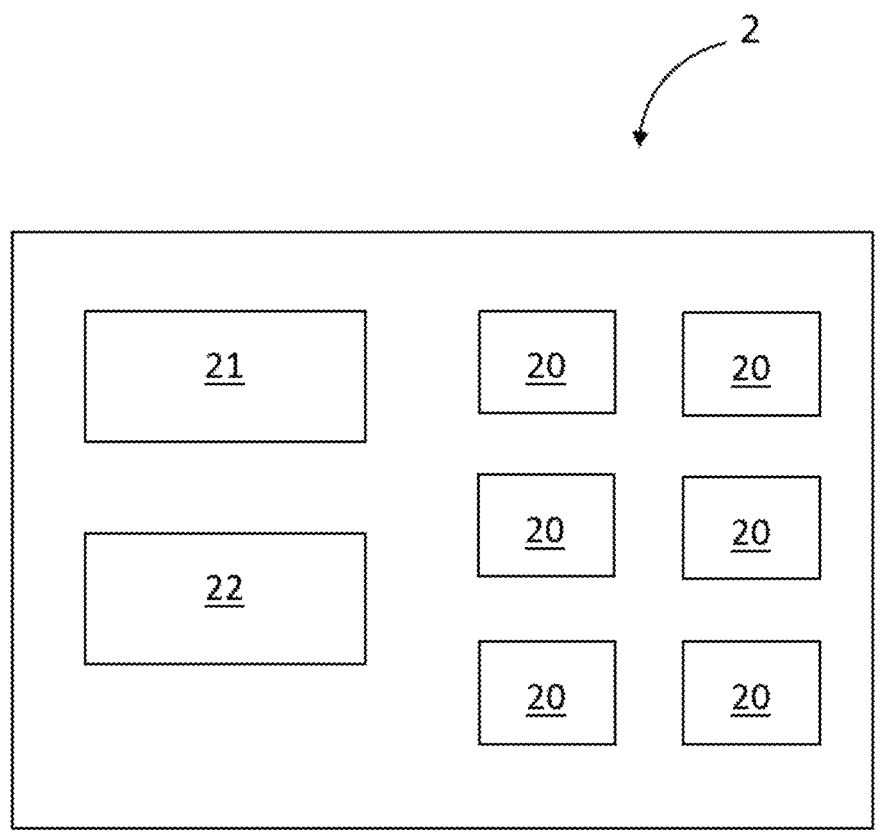
FIG. 6 is a functional block diagram of a display device according to an embodiment of the present disclosure.

FIG. 6 is a functional block diagram of a display device according to an embodiment of the present disclosure. As shown in FIG. 6, a display device 2 includes a plurality of display screens 20 spliced together, a processing unit 21, and a storage 22. The processing unit 21 is configured to execute the following steps:

first, defining a tolerance scope of chromatic aberration;

second, determining a varying scope of chromatic aberration of the display device 2 according to chromatic aberrations of the plurality of display screens 20;

next, defining a plurality of adjusting levels of chromatic aberration according to the tolerance scope of chromatic aberration and the varying scope of chromatic aberration;

next, setting a color offset value corresponding to each of the plurality of adjusting levels of chromatic aberration; and lastly, for each of the plurality of display screens 20, selecting a corresponding adjusting level of chromatic aberration in comparison to one of the plurality of display screens 20, and inputting a corresponding color offset value of the selected adjusting level of chromatic aberration to each of the plurality of display screens 20. In some embodiments, the processing unit 21 can select the corresponding adjusting level of chromatic aberration through an external trigger instruction from one of a remote controller, a computer, a dialer, and a button.

Furthermore, the storage 22 is configured to store the color offset value. Specifically, the color offset value corresponds to a set of default values of red, blue, and green. In some embodiments, the storage 22 is selected from one of a read-only memory (ROM), a random-access memory (RAM), a flash memory, a hard disk, and an optical disk.

In conclusion, the present disclosure provides a display device and a method of adjusting a chromatic aberration of a display device mainly through selecting a corresponding adjusting level of chromatic aberration and inputting a corresponding color offset value of the selected adjusting level of chromatic aberration for each display screen, which can effectively adjust chromaticity of the display device and thus improve problems of chromatic aberration.

It should be understood that the application of the present disclosure is not limited by the foregoing examples. A person of ordinary skill in the art is able to make modifications or changes based on the foregoing description, and all of these modifications and changes are within the scope of the appended claims of the present disclosure.

The industrial applicability of the present disclosure is that, a display device and a method of adjusting a chromatic aberration of a display device are provided to effectively adjust chromaticity of the display device and to improve problems of chromatic aberration.

What is claimed is:

1. A computer-implemented method of adjusting a chromatic aberration of a display device comprising a plurality of display screens spliced together and a processing unit, the method comprising:
   defining, by the processing unit, a tolerance scope of chromatic aberration;
   determining, by the processing unit, a varying scope of chromatic aberration of the display device according to chromatic aberrations of the plurality of display screens;
   defining, by the processing unit, a plurality of adjusting levels of chromatic aberration according to the tolerance scope of chromatic aberration and the varying scope of chromatic aberration, wherein an adjusting range of chromatic aberration of a middle level of the adjusting levels of chromatic aberration is zero;
   setting, by the processing unit, a color offset value corresponding to each of the plurality of adjusting levels of chromatic aberration; and
   for each of the plurality of display screens, selecting, by the processing unit, a corresponding adjusting level of chromatic aberration in comparison to one of the plurality of display screens, and inputting a corresponding color offset value of the selected adjusting level of chromatic aberration to the each of the plurality of display screens.

2. The computer-implemented method of claim 1, wherein an adjusting range of chromatic aberration of the highest level of the adjusting levels of chromatic aberration is a sum of upper limits of the varying scope of chromatic aberration and the tolerance scope of chromatic aberration.

3. The computer-implemented method of claim 1, wherein an adjusting range of chromatic aberration of the second highest level of the adjusting levels of chromatic aberration is an upper limit of the varying scope of chromatic aberration.

4. The computer-implemented method of claim 1, wherein an adjusting range of chromatic aberration of the second lowest level of the adjusting levels of chromatic aberration is a lower limit of the varying scope of chromatic aberration.

5. The computer-implemented method of claim 1, wherein an adjusting range of chromatic aberration of the lowest level of the adjusting levels of chromatic aberration is a lower limit of the varying scope of chromatic aberration less a lower limit of the tolerance scope of chromatic aberration.

6. The computer-implemented method of claim 1, wherein the color offset value corresponds to a set of default values of red, blue, and green.

7. A display device, comprising:
   a plurality of display screens spliced together;
   a processing unit configured to:
   define a tolerance scope of chromatic aberration;
   determine a varying scope of chromatic aberration of the display device according to chromatic aberrations of the plurality of display screens;
   define a plurality of adjusting levels of chromatic aberration according to the tolerance scope of chromatic aberration and the varying scope of chromatic aberration, wherein an adjusting range of chromatic aberration of a middle level of the adjusting levels of chromatic aberration is zero;
   set a color offset value corresponding to each of the plurality of adjusting levels of chromatic aberration; and
   for each of the plurality of display screens, select a corresponding adjusting level of chromatic aberration in comparison to one of the plurality of display screens, and input a corresponding color offset value of the selected adjusting level of chromatic aberration to the each of the plurality of display screens; and
   a storage configured to store the color offset value.

8. The display device of claim 7, wherein the processing unit selects the corresponding adjusting level of chromatic aberration through an external trigger instruction from one of a remote controller, a computer, a dialer, and a button.

9. The display device of claim 7, wherein the storage is selected from one of a read-only memory, a random-access memory, a flash memory, a hard disk, and an optical disk.

* * * * *